United States Patent
Bauer et al.

(10) Patent No.: US 6,366,663 B1
(45) Date of Patent: Apr. 2, 2002

(54) SYSTEM FOR ACHIEVING LOCAL NUMBER PORTABILITY

(75) Inventors: Deborah L. Bauer, Leesburg, VA (US); Ross Edward Button, Carleton Place (CA); Mike Cavanagh, Woodlawn (CA); Susan Jane McQuigge Ernst, Gloucester (CA); Kevin Germann, Gatineau (CA); Ralph Holmes, Glenn Dale, MD (US); Samuel S. Howlette, Great Falls, VA (US); William Kayln, Kanata (CA); Steve Sauve, Orleans (CA); Francis C. Sommers, Ottawa (CA)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/897,906

(22) Filed: Jul. 21, 1997

(Under 37 CFR 1.47)

(51) Int. Cl.[7] ................................................ H04M 3/42
(52) U.S. Cl. .................... 379/221.13; 379/219; 379/220
(58) Field of Search ................................. 379/219, 220, 379/221, 207, 229, 230

(56) References Cited

U.S. PATENT DOCUMENTS

| 5,218,632 A | 6/1993 | Cool ........................... 379/126 |
| 5,325,290 A | 6/1994 | Cauffman et al. ........... 379/112 |
| 5,333,183 A | 7/1994 | Herbert ....................... 379/112 |
| 5,384,822 A | 1/1995 | Brown et al. |
| 5,546,574 A | 8/1996 | Grosskopf et al. .......... 395/600 |
| 5,566,235 A | 10/1996 | Hetz ........................... 379/201 |
| 5,606,600 A | 2/1997 | Elliot et al. ................. 379/112 |
| 5,625,681 A | 4/1997 | Butler, II ..................... 379/207 |
| 5,625,816 A | 4/1997 | Burdick et al. ............. 395/614 |
| 5,703,939 A | 12/1997 | Bushnell ..................... 379/113 |

(List continued on next page.)

FOREIGN PATENT DOCUMENTS

EP          0710042 A2       5/1996

OTHER PUBLICATIONS

Newton, "Newton's Telecom Dictionary," Flatiron Publishing, Inc., 1994, p. 714.

*Primary Examiner*—Ahmad F. Matar
*Assistant Examiner*—Hector Agdeppa (57) ABSTRACT

A system for maintaining a customer's telephone number when a switch from one service provider to a second provider is made interfaces with a regional customer number database to keep track of local numbers and the corresponding local service provider which services each number. Service providers interface with the database and obtain information at the telephone number level that permits individual providers to determine which carrier is providing service to which telephone number. A neutral third party maintains and administers the database allowing free access by any participating provider.

8 Claims, 7 Drawing Sheets

U.S. PATENT DOCUMENTS

| | | | | |
|---|---|---|---|---|
| 5,715,303 A | | 2/1998 | Marks et al. | 379/112 |
| 5,717,745 A | | 2/1998 | Vijay et al. | 379/112 |
| 5,717,749 A | * | 2/1998 | Sneed, Jr. et al. | 379/207 |
| 5,734,705 A | | 3/1998 | Scholossman et al. | 370/117 |
| 5,757,895 A | | 5/1998 | Aridas et al. | 379/112 |
| 5,761,272 A | | 6/1998 | Williams et al. | |
| 5,764,745 A | * | 6/1998 | Chan et al. | 379/207 |
| 5,765,172 A | | 6/1998 | Fox | 707/204 |
| 5,774,532 A | | 6/1998 | Gottlieb et al. | 379/112 |
| 5,784,443 A | | 7/1998 | Chapman et al. | 379/119 |
| 5,787,147 A | | 7/1998 | Gundersen | 379/1 |
| 5,793,861 A | | 8/1998 | Haigh | 379/266 |
| 5,809,108 A | | 9/1998 | Thompson et al. | 379/15 |
| 5,832,068 A | | 11/1998 | Smith | 379/114.14 |
| 5,835,497 A | | 11/1998 | Litzenberger et al. | 370/522 |
| 5,835,757 A | | 11/1998 | Oulid-Aissa et al. | 395/610 |
| 5,854,834 A | | 12/1998 | Gottieb et al. | 379/113 |
| 5,883,948 A | | 3/1999 | Dunn | 379/210 |
| 5,896,440 A | | 4/1999 | Reed et al. | 379/1 |
| 5,901,215 A | | 5/1999 | Dezenno | 379/266 |
| 5,903,632 A | | 5/1999 | Brandon | 379/93.23 |
| 5,910,983 A | | 6/1999 | Dezonno et al. | 379/266 |
| 5,912,962 A | * | 6/1999 | Bosco | 379/219 |
| 5,933,489 A | * | 8/1999 | Sensabaugh et al. | 379/219 |
| 5,940,492 A | * | 8/1999 | Galloway et al. | 379/230 |
| 5,949,867 A | * | 9/1999 | Sonnenberg | 379/211 |
| 5,951,654 A | | 9/1999 | Avsan et al. | 710/5 |
| 5,978,464 A | * | 11/1999 | Sonnenberg | 379/220 |
| 5,987,114 A | * | 11/1999 | Sonnenberg | 379/220 |
| 6,047,045 A | | 4/2000 | Bauer et al. | 379/26.01 |
| 6,064,887 A | | 5/2000 | Kallioniemi et al. | 455/445 |
| 6,067,354 A | | 5/2000 | Bauer et al. | 379/113 |
| 6,169,793 B1 | | 1/2001 | Godwin et al. | 379/221.13 |

* cited by examiner

SYSTEM FOR ACHIEVING LOCAL NUMBER PORTABILITY

TECHNICAL FIELD

The present invention relates in general to the field of telecommunications and more specifically to a system and associated methods for keeping a customer's telephone number when a switch is made from one telecommunications service provider to another.

BACKGROUND OF THE INVENTION

Without limiting the invention, its background is described in connection ith local telephone services and providers of such services.

In general, the telecommunications industry has evolved into a highly competitive and sophisticated network of equipment manufacturers and service providers. Since the early 1980s, the industry has seen a shift from pure analog techniques over copper wire to digital techniques using fiber optic cabling. Today, customers can choose from a large array of consumer telecommunications services including local and long distance calling, 800 and 900 calling accounts, TCP/IP (i.e. the "Internet") and others.

Typically, a telecommunications customer obtains access to such services by establishing an account with a service provider. The service provider, in turn, will assign to the customer a telephone number for inbound calls or provide the customer with a dial-up number for outbound calls. For example, the number can be the local telephone number where the customer can be reached such as a home or business. The number can also be the local dial-in to an automated system for a switched connection to a network element such as a domain server. Other examples include, but are not limited to, a customer's facsimile machine, cell phone number or voice mail.

At the same time industry deregulation has brought about the entry of multiple service providers within single geographic regions. In addition to competition, the number and variety of telecommunications services continues to increase. Typically, a category of service is tied to a single unique number so that any one customer may consume a host of numbers to accommodate a host of services. Thus, a common situation has evolved wherein a single customer will have a home number, an office number, a facsimile machine number, a cell phone number, an Internet account number and possibly others, as examples.

Today's service providers employ advanced information technology systems using sophisticated equipment such as routers, switches and digital cross-connects. At a minimum, the equipment must be configured to ensure calls reach their destination regardless of the service provider. While industry standards and communications protocols have been adopted by the industry, cooperation amongst service providers has been critical to implementing a reliable network. Today, a customer can place a clear noise free call from almost anywhere in the world.

The Public Switched Telephone Network ("PSTN") comprises the telecommunications backbone for most voice/data traffic in the world. For most local and long distance telephone calls a local telephone company acts as a local entry point to the PSTN. Typically, a Local Routing Number ("LRN") is used to route the call from a point of origination to a point of destination on the PSTN. This is true regardless of who is servicing the call at either point.

This infrastructure, however, does not always accommodate a change in the service needs of an end customer. For example, often a customer desires to switch service providers to take advantage of a more attractive rate plan. The problem lies in that the customer is not guaranteed to maintain the same local number even if the customer remains at the same location. Thus, until the present invention, there was no way to port a customer's number from one service provider to another within the same local region.

In short, as competition for communications services has grown so has the value attached to a customer's telephone number. At present, different "LRNs" are used among different service providers. Moreover, service providers have not developed a means for reliable call routing when a switch from one provider to another is made. Until the present invention, the only solution was to assign a new telephone number not already in use by another customer.

While long distance carriers have enacted portability solutions on a regional or even national basis for certain classes of services, such as 800 and 900 accounts, the local portability problem has not, until the present invention, been squarely addressed. Moreover, prior art efforts at local number portability have not been widespread. For example, an industry task force was formed, pursuant to the Illinois Commerce Commission Order on Customers First Plan (Docket 94-0096 dated Ap. 7, 1995), to develop a permanent number portability solution for Illinois. While the task force made progress in defining the problem and resolving certain issues related to implementing local number portability, it did not resolve the problem on a nationwide basis. Nor did the commission establish the hardware and software interfaces required to implement a nationwide portability solution.

Thus, a need exists for a system and method of achieving local number portability on a nationwide basis. A system and method of sharing a single telephone number over different local exchange carriers would fill a void not presently addressed by the prior art.

SUMMARY OF THE INVENTION

As such, a primary object of the present invention is to provide a hardware and software platform to effect the porting of local telephone numbers from one service provider to another. The systems and subsystems of the invention are designed to communicate with a Number Portability Administration Center Service Management System ("NPAC/SMS") which receives and stores updated customer routing information and makes it available to participating service providers. The NPAC/SMS contains a record of all ported numbers and a history file of all transactions relating to the porting of a number.

Another object of the present invention is to provide a system for Local Number Portability ("LNP") that submits service orders changes to a NPAC/SMS. In this regard, a Service Order Administration ("SOA") subsystem is provided as means of entering and submitted services order changes to the NPAC/SMS via an interface that supports the retrieval and update of subscription, service provider and network information. A graphical user interface or a message-based interface to a service provider's upstream systems may be used for this purpose.

Another object of the present invention is to provide a facility for administering the service provider subscription information relating to a particular customer. In this regard, the SOA is equipped with a host of functions for creating, canceling, acknowledging, modifying, retrieving, activating, disconnecting and removing subscription version information. The SOA has an audit capability that permits audits of a customer's porting activity based on a telephone number and receives notifications from a NPAC/SMS to ensure that it is fully informed of relevant events relating to a service provider's subscriptions.

Still another object of the present invention is to provide the interface structures that permit service providers to read and update their own service provider information within a NPAC/SMS. In this regard, the interface permits service providers to update the information in their service provider profile as well as add and delete their own network data. The information is accessible to all service providers via a standard interface to assure correct call routing.

Another object of the present invention is to provide a system that interfaces directly with existing telecommunication equipment operated by all service providers. In this regard, a new service provider can obtain authorization to port a customer using a standardized message format that notifies an old service provider according to processes internal to the old service provider. The messaging format includes signal protocols that can be used by both the old and new service providers to sends update notifications to the NPAC/SMS using the SOA. Upon receipt of the notification(s), the NPAC/SMS performs certain validation checks, and attempts to match a notification received from the new service provider with a concurring notification that may be sent from the old service provider, permitting the two service providers to complete the port.

Yet another object of the present invention is to provide a means of downloading subscription and network data from a NPAC/SMS to the local service provider's applications for correct call routing and network provisioning. In this regard, an Interface Broadcast Agent ("IBA") subsystem is provided as a means of interfacing a service provider's downstream systems with the NPAC/SMS. In one embodiment, the IBA subsystem is configured to automatically receive new network or subscription data or modifications to existing data. The IBA may also request data using a download request. The request can be based on time range, telephone number, telephone number range or other indicator. A service provider can also directly read the data from the NPAC/SMS.

The invention provides the software and hardware platforms for achieving Local Number Portability. A central or regionalized database is used to keep track of local numbers and the corresponding local service provider that services each number. Service providers interface with the database and obtain information at the telephone number level that permits individual providers to determine which carrier is providing service to which telephone number. A neutral third party maintains and administers the database allowing free access by any participating provider. Methods for transferring a customer's port data from an old service provider to a new service provider are also disclosed.

Disclosed, in one embodiment, is a system for maintaining a customer's local telephone number when a switch is made from a first service provider to a second service provider. The system uses a regional number portability subsystem containing a plurality of telephone number porting data defining how to route a call from one service provider to another. A service order application is communicably linked to the regional number portability subsystem and configured to send a porting request for a specific customer to the portability subsystem and service providers interfaced to the subsystem. A local service management application is communicably linked to the regional number portability subsystem via a second data pathway and configured to receive the porting request. The local service management application supports the interface to the second service provider and delivers the porting request containing the new routing data for the customer allowing the customer to maintain their existing telephone number once the switch is made.

For a more complete understanding of the present invention, including its features and advantages, reference is now made to the following detailed description, taken in conjunction with the accompanying drawings.

BRIEF DESCRIPTION OF THE DRAWINGS

In the drawings.

Corresponding numerals in the drawings refer to corresponding parts unless otherwise indicated.

DETAILED DESCRIPTION OF THE INVENTION

Figure 1:
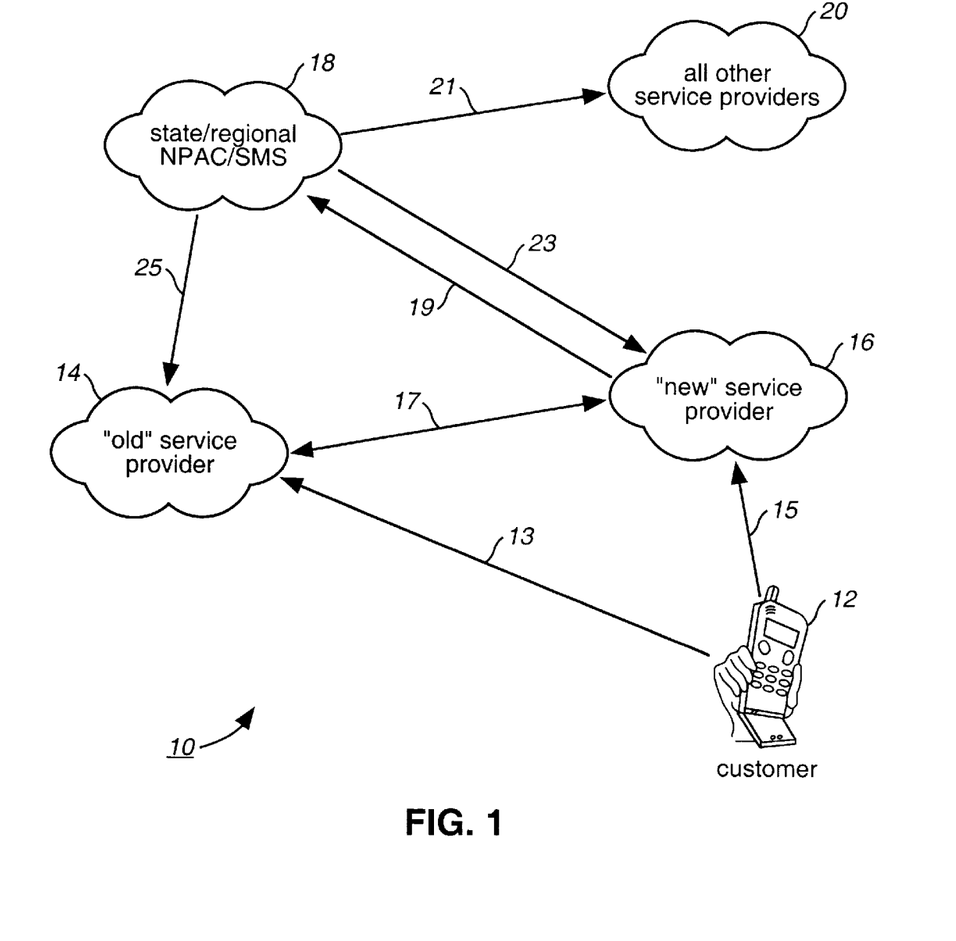
FIG. 1 is an overall process flow diagram for the method used to transfer a customer's port data from an old service provider to a new service provider according to one embodiment of the invention.

Turning now to FIG. 1, a flow diagram of a telephone number porting process, denoted generally as 10, is shown. In general, process 10 is used by a customer 12 to achieve Local Number Portability ("LNP") when switching from one service provider 14 to another 16. As shown, a customer 12 initiates the process 10 by contacting either an old service provider 14 or a new service provider 16 to arrange a transfer of the customer's porting data from the old service 14 to the new service 16. The communications between the customer 12 and the old service provider is indicated by link 13 while link 15 represents the communications link with the new service provider 16. Thereafter, the old service provider 14 and new service provider 16 communicate via link 17 with each other in order to arrange a data port for the customer 12.

Once the new service provider 16 has obtained the customer's port data, the provider 16 notifies the Number Portability Administration Center Service Management System ("NPAC/SMS") 18 of the pending port prior to activation. The interface between the new service provider 16 and the NPAC/SMS 18 is supported by link 19 and conforms to recognized industry standards such as the "NPAC/SMS Interoperable Interface Specification", version 1.0, by Lockheed Martin IMS Corporation, October, 1996. In general, the NPAC/SMS 18 maintains a centralized regional number database for all customers in a given region and receives the port request from a new service provider 16.

According to the invention (see FIGS. 4 through 7), an interface is established between the NPAC/SMS 18 and the participating service providers permitting the transfer of the customer's port data.

A customer's port request is communicated to either the customer's old service provider 14 or a new service provider 16 to the NPAC/SMS 18. After the port request has been received by the NPAC/SMS 18, the NPAC/SMS 18communicates with the old service provider 14, the new service provider 16 and all other service providers 20, via links 25, 23 and 21, respectively, to activate the port. This permits a customer 12 to port his existing number from an old service provider 14 to a new service provider 16 while at the same time notifying all other service providers 20 within that region that the port has been completed allowing proper call routing.

With the knowledge that the customer's number has been ported from one provider to another, all service providers 14, 16, and 20 can configure their networking equipment for correct call routing within that region. The particular embodiment of the present invention incorporates significant advantages in that it allows for the sending and receiving of porting data from regional databases (i.e. maintained at the NPAC/SMS 18) providing for a smooth transition from an old service provider 14 to a new service provider 16.

Figure 2:
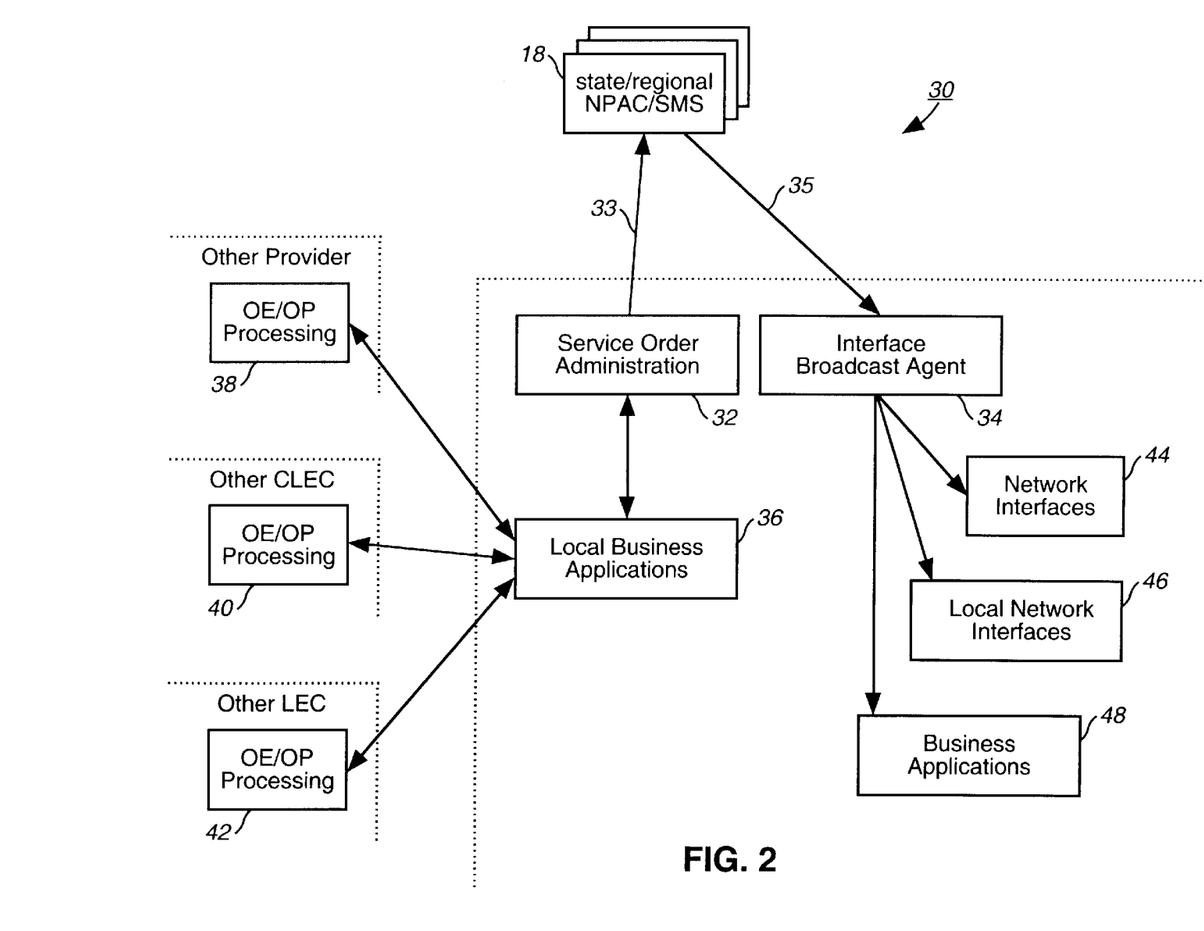
FIG. 2 is a high level block diagram for the interface between a Service Order Administration ("SOA"), an Interface Broadcast Agent ("IBA") and a regional number portability administration center according to one embodiment of the invention.

Turning now to FIG. 2, a block diagram of a system for achieving local number portability is shown and denoted generally as 30. Specifically, FIG. 2 shows that the regional NPAC/SMS 18 is communicably linked to two functional sub-systems, or applications a Service Order Administration ("SOA") sub-system 32 or service order application and an Interface Broadcast Agent ("IBA") sub-system 34 or local service management application via communications links 33 and 35, respectively.

The SOA 32 is the responsible application that sends the customers port data from one service provider to another service provider. Likewise, the IBA 34 is the responsible application for service management processes at the local network level. The SOA 32 and IBA 34 work together with the NPAC/SMS 18 to send and receive customer porting data from regional call routing centers and data sources to more centralized information sources and applications. This configuration 30 provides a distributed architecture which allows the porting of data to the local applications and networking equipment maintained by service providers for appropriate call routing and processing.

In one embodiment, the SOA 32 is communicably linked to one or more local applications 36, which are maintained by the regional service provider. Examples of the local applications 36 include, but are not limited, to local residential and business lines for voice, data and fax communications as provided by the local service provider. The local applications 36, in turn, are communicably linked and used by other service providers 38, other Complex Local Exchange Carriers ("CLEC") 40 and yet other Local Exchange Carriers ("LEC") 42 depending on the existing network of service providers. It is the SOA 32 that acts as an intermediary between the local applications 36 and the regional NPAC/SMS 18 thus providing a smooth non-intrusive solution for local number portability.

Likewise, the IBA 34 provides the interface between the regional NPAC/SMS 18 and a plurality of other network entry systems such as those shown in boxes 44, 46 and 48. The specific functionality of the network entry systems 44, 46 and 48 may vary but in general they form a platform for receiving, storing, and routing customer port data. Examples of services that use the port data include local and long distances networks and 800 services.

For example, business applications 48 can comprise a database of records for all provider systems needing access to the customer porting data. An example well known to those skilled in the art is the ANI reference information system. The local network interfaces 46 can be an intelligent network architecture that supports routing queries during call processing. An example of a network interface 44 would include the Metro Intelligent Network Architecture that forms a tie-in into available communications services. Such services may include an 800 or 900 service or other similar offerings that may require access to the port data through a regional toll switch network from the NPAC/SMS 18 for correct call servicing and routing.

While FIG. 2 illustrates a single embodiment for achieving local number portability, it should be understood that other architectures may be similarly conceived and reduced to practice upon reference to this disclosure. It is anticipated therefore, that such other embodiments are well within the scope and spirit of the present invention. Specifically FIGS. 4 through 7 disclose detailed architectural designs, in the form of block diagrams, for various subsystems, including an SOA 32 and IBA 34, which may be used in a specific and preferred embodiment for achieving local number portability.

Figure 3:
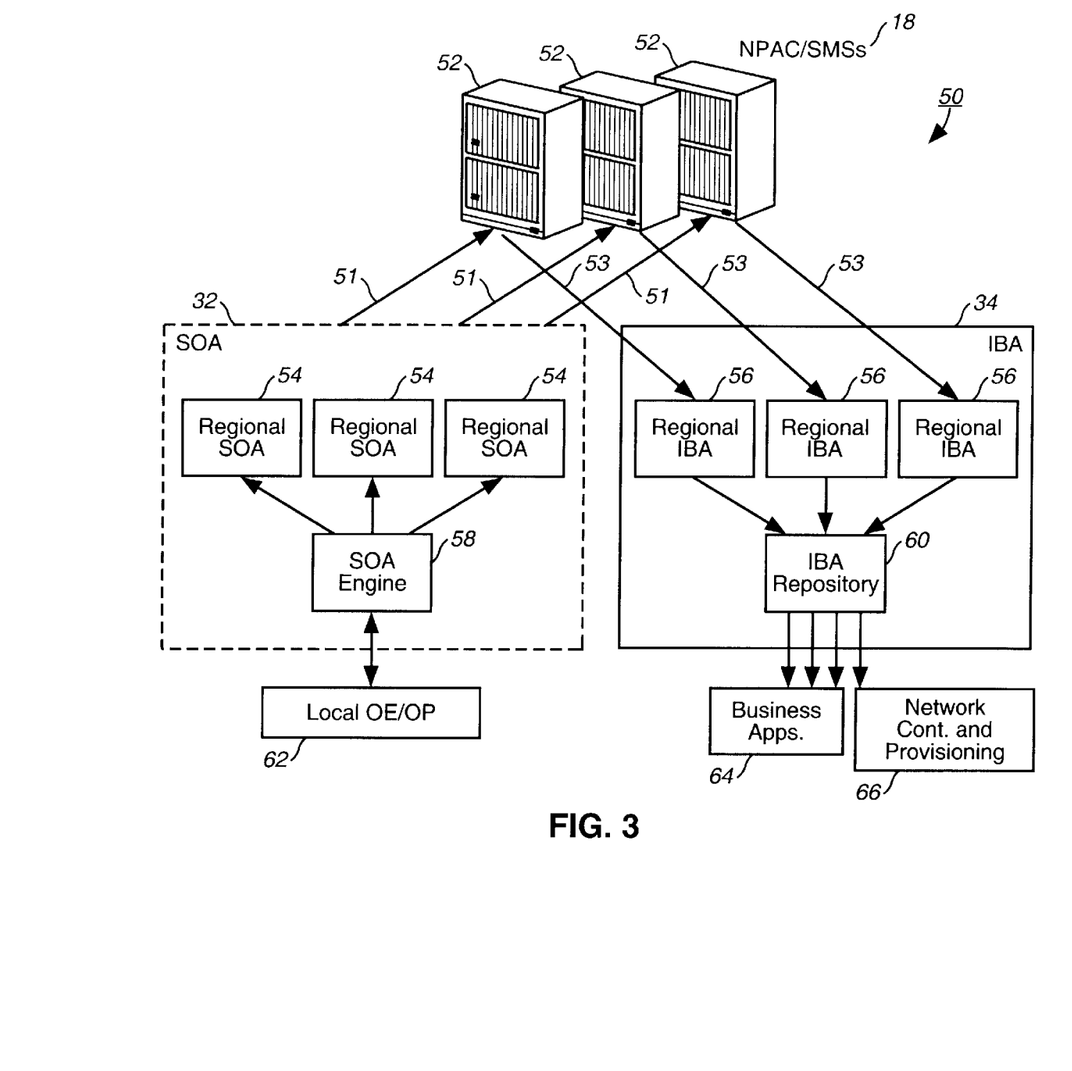
FIG. 3 is a block diagram of the SOA and IBA subsystems and their interface to various business applications.

Turning now to FIG. 3, a diagram illustrating the interaction between the NPAC/SMS 18, the SOA 32 and the IBA 34 sub-systems is shown and denoted generally as 50. Customer Order Entries and Order Processing ("OE/OP") at the local level are represented at 62, which as shown is coupled to local SOA engine 58. The SOA engine 58 feeds customer telephone information into the regional SOAs 54 located in various regions. The SOA sub-system 32 comprises the regional SOAs 54 and SOA engine 58. While the use of three (3) regional SOAs 54 in FIG. 3, it is envisioned that each region providing local number portability will have a corresponding SOA 54.

An interface between the SOA sub-system 32 and the NPAC/SMS 18 computer processing systems 52 is shown by lines 51. The SOA sub-system 32 sends the port data to systems 52 which, in turn, relay the port request in a predefined message format to the IBA sub-system 34.

Likewise, the IBA sub-system 34 comprises a plurality of regional IBAs 56 that update the IBA repository 60. The IBA repository 60 is accessible by a plurality of downstream applications such as business applications 64 and network provisioning and configuration systems 66. It should be understood, however, that any type of downstream system can be connected to the IBA repository 60 at the option of the service provider. In this way the porting data is distributed to existing network applications, such as long distance and local business, for proper call routing and processing.

Figure 4:
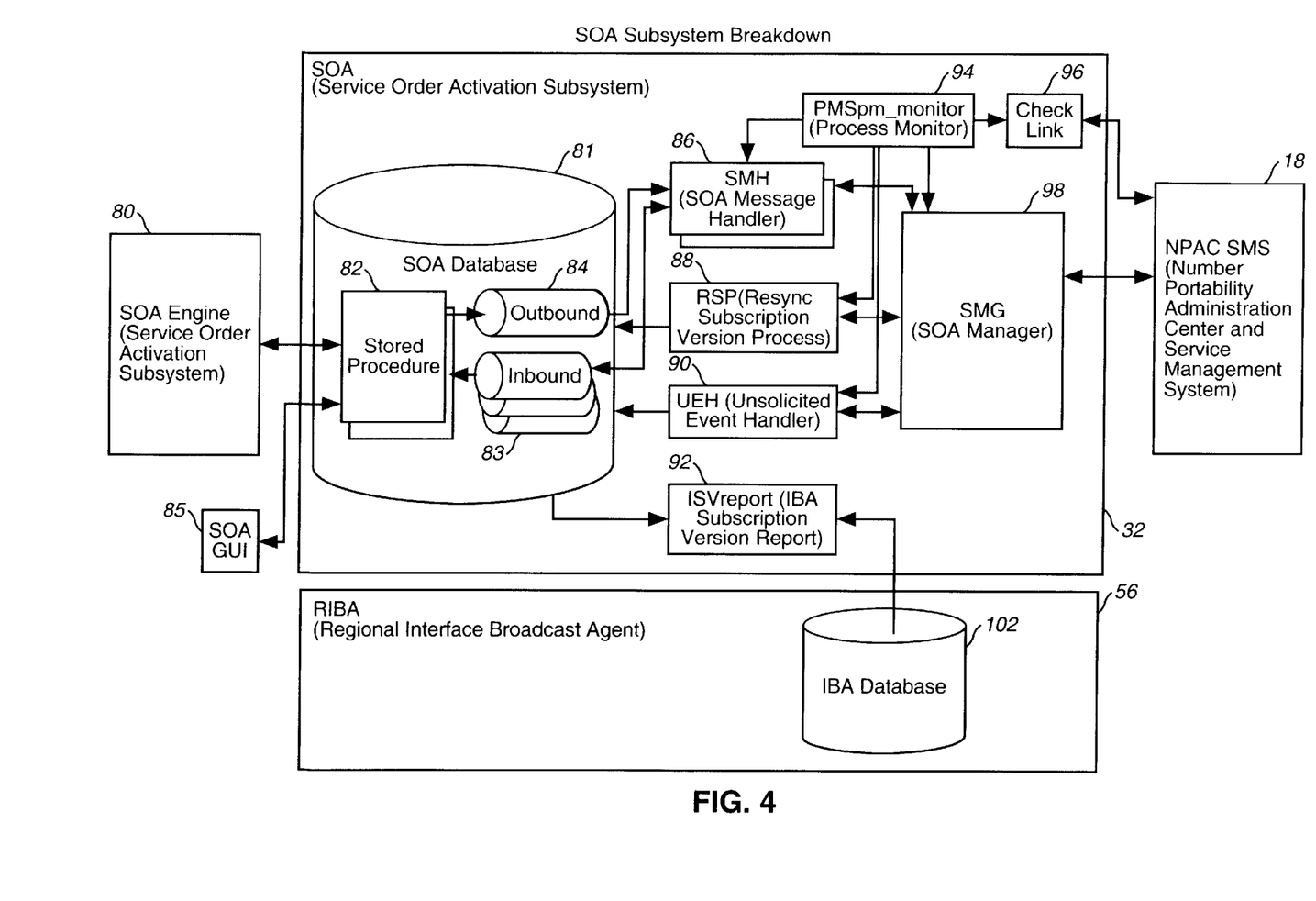
FIG. 4 is a block diagram of an SOA broken down into its component subsystems according to one embodiment.

The SOA subsystem 32 provides the means for submitting customer service order changes to the NPAC/SMS 18. Turning now to FIG. 4, the SOA 32 is shown broken down into its functional components. LNP transactions originating either from a GUI interface or the SOA Engine 80 are received through stored procedures 82. The stored procedures 82 place the transaction information into the outbound link 84 and received by the SOA Message Handler ("SMH") 86 that reads and processes the information. The SMH 86 queries the SOA Database 81 for any required extra information and passes the transaction onto the SOA Manager ("SMG") 98, which sends the transaction to the NPAC/SMS 18 and waits for a response. When the response is received from the NPAC/SMS 18, it is routed back to the SMH 86, which then loads it into an inbound link 84 for the stored procedure 82.

The SMG 98 also receives notifications from the NPAC/SMS 18. Notification transactions are passed onto the Unsolicited Event Handler ("UEH") 90 which, in turn, processes the transactions and updates the SOA database 81 when necessary.

Also shown is a Resynch Subscription Version Process ("RSP") 88 coupled to the SOA database 81 where it is used to synchronize the SOA subsystem 32 after a period of downtime. After the SMG 98 binds to the NPAC/SMS 18, the RSP 88 is started. In operation, the RSP 18 requests from the NPAC/SMS 18 all subscription versions that have a modification time-stamp more recent than the last time the SMG 98 had an association with the NPAC/SMS 18. The RSP 88 also sets a downtime flag in an audit database tables to indicate that an audit was ongoing during a period of downtime.

The IBA Subscription Version Report ("ISVR") 92 is used to report discrepancies between the SOA Database 81 and IBA Database 102. The Check Link 96 monitors the physical connection between the SOA 32 and NPAC/SMS 18. If the physical connection is broken, the Check Link 96 will reset the SOA subsystem 32.

All the processes within the SOA subsystem 32 (with the exception of the ISV report 92) are monitored by the Process Monitor 94. The Process Monitor 94 starts applications when they are required and if an application terminates, the Process Monitor 94 is notified. The Process Monitor 94 automatically restarts applications that are intended to always be running, like the SMG 98 and Check Link 96, if they terminate. The one exception is the ISVreport 92 which is operator controlled and is not monitored by the Process Monitor 94.

In the preferred embodiment, the Process Monitor 94 is the parent process for the SOA 32 and IBA 34 subsystems. The Process Monitor 94 will watch over all of the standard processes required to run the subsystems 32, 34 and keeps a table of all applications spawned and operational information about each such application.

The SOA Message Handler 86 allows the GUI component of the SOA 32 to communicate with the NPAC/SMS 18. In one embodiment, multiple instances of the SOA Message Handler 86 are run to allow for greater throughput wherein each such instance of the SOA Message Handler 86 receives requests from a single outbound link 84. Thus, all output to the stored procedures 82 is done through separate links, one for each GUI workstation.

The SOA Message Handler 86 receives messages from the GUI via the outbound link 84. Messages are processed, data acquired and organized by tasks which preferably are broken down at an object level (i.e. Subscription Version, Audit, Service Provider, and Network). Based on a message identifier, the SOA Message Handler 84 is configured to collect and assemble the information required by the NPAC/SMS 18.

In one embodiment, messages are relayed to a DSET Distributed Systems Generator ("DSG") Manager through a UNIX sockets interface. The DSET DSG Manager is used to implement the interface between the SOA 32 and the NPAC/SMS 18. The UNIX sockets are used for the interface between the IBA Agent 112 (See FIG. 5) and other IBA applications as well as the SOA Manager 98 and other SOA applications.

All outgoing messages that go to the NPAC/SMS 18 are logged. The SOA subsystem 32 then waits for a response (successful, failure or timeout) from the DSET DSG Manager. The SOA subsystem 32 processes any data received with the reply, updating the SOA database 81 where required, and relays the request result back to the GUI application through one or inbound link(s) 83.

The Unsolicited Events Message Handler 90 is used by the SOA subsystem 32 to handle notification data received from NPAC/SMS 18. The Unsolicited Events Message Handler 90 starts up by making a connection to the UNIX sockets and then waiting for a message to be sent from the DSET DSG Manager.

When a message is received by the Unsolicited Events Message Handler 90 from the DSET interface agent, the Unsolicited Events Message Handler 90 determines the type of message and performs the required actions for that message type. When the action is complete the Unsolicited Events Message Handler 90 formats and sends a reply to the DSET DSG Manager which translates the message into a CMIP event and sends the event to NPAC/SMS 18. The Unsolicited Events Message Handler 90 resumes waiting for the next message to appear in the UNIX socket.

As stated the SOA Database 81 is used to store and maintain the current 10 number information for a customer. Table 1 below is domain field listing for an SOA Database 81 according to one embodiment:

TABLE 1

Domain List for one Embodiment of the SOA Database 81.

| Name | Code | Label | Type |
|---|---|---|---|
| BillingIdentifier | BILLING_ID | Billing Identifier | VARCHAR2(4) |
| BooleanIndicator | BOOL_IND | Boolean Indicator | NUMBER(1) |
| City | CITY | | VARCHAR2(20) |
| CLASS DPC | CLASS_DPC | | VARCHAR2(9) |
| CLASS SSN | CLASS_SSN | | NUMBER(3) |
| CNAM DPC | CNAM_DPC | | VARCHAR2(9) |
| CNAM SSN | CNAM_SSN | | NUMBER(3) |
| ContactType | CONTACT_TYP | Contact Type | VARCHAR2(2) |
| Country | COUNTRY | | VARCHAR2(20) |
| EndUserLocation Type | END_USER_LOC_TYPE | | VARCHAR2(2) |
| EndUserLocation Value | END_USER_LOC_VALUE | | VARCHAR2(12) |
| Identifier | ID | | NUMBER(10) |
| Identifier | ID2 | | NUMBER(10) |
| ISVM DPC | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB_SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |
| NPA NXX | NPA_NXX2 | NPA-NXX | VARCHAR2(6) |
| OperationAction | OPER_ACT | Operation Action | NUMBER(3) |
| Postal Code | PC | Postal Code | VARCHAR2(40) |
| ServProvID | SP_ID | | VARCHAR2(4) |
| ServProvID | SP_ID2 | | VARCHAR2(4) |
| StateProvince | STATE_PROV | State/Province | VARCHAR2(2) |
| Status | STATUS | Status Flag | NUMBER(10) |
| SystemType | SYSTEM_TYPE | | NUMBER(1) |
| Telephone Number | TN | Telephone Number | VARCHAR2(10) |
| Timestamp | T2 | | DATE |
| Timestamp | T | | DATE |
| TunableName | TUNABLE_NAME | Tunable Name | VARCHAR2(40) |

TABLE 1-continued

Domain List for one Embodiment of the SOA Database 81.

| Name | Code | Label | Type |
|---|---|---|---|
| TunableValue | TUNABLE_VALUE | Tunable Value | VARCHAR2(40) |
| UserIdentifier | USER_ID | | VARCHAR2(30) |
| Zip | ZIP | | VARCHAR2(9) |

Figure 5:
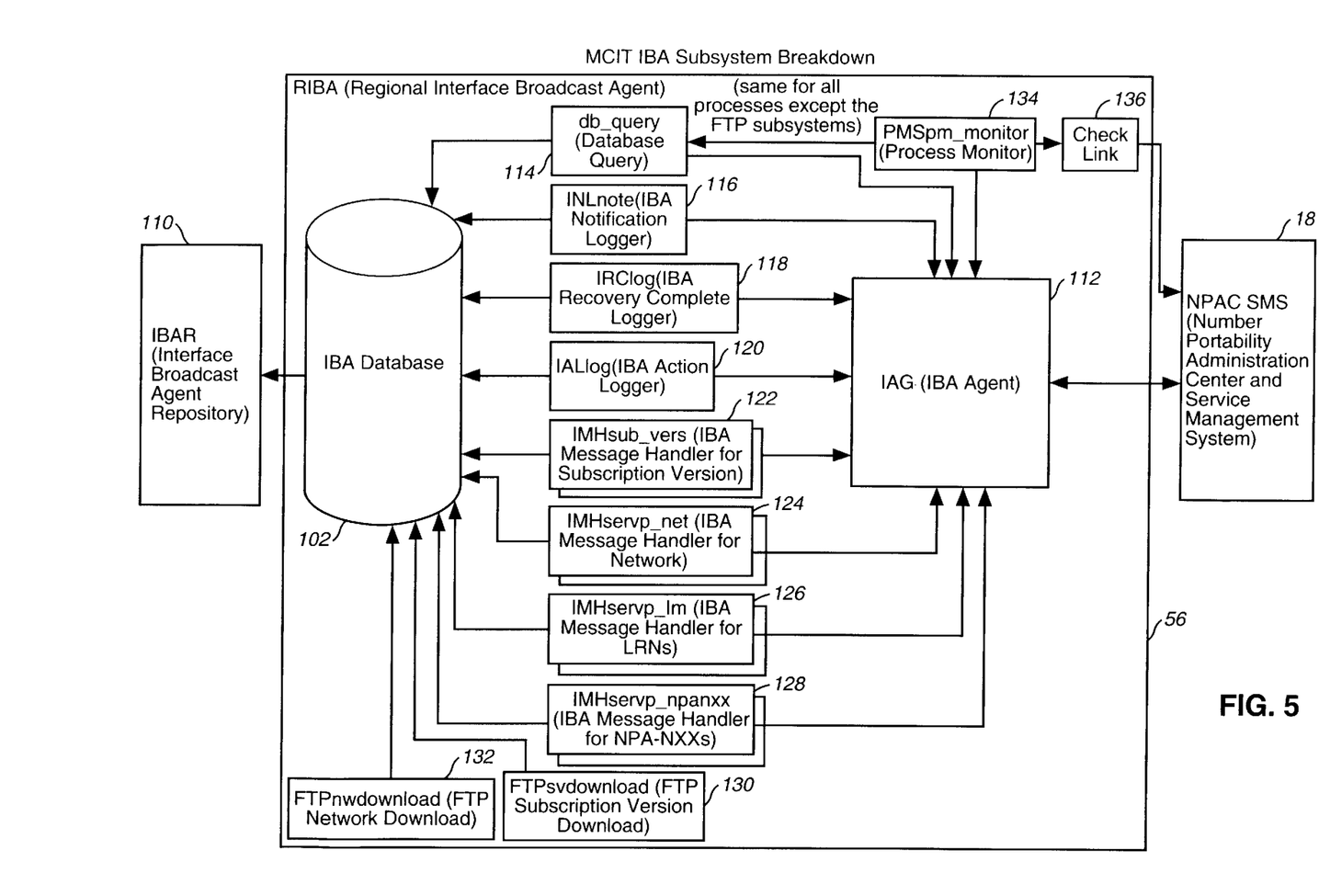
FIG. 5 is a block diagram of the IBA broken down into its component subsystems according to one embodiment.

Turning to FIG. 5, the Regional Interface Broadcast Agent ("RIBA") 56 is broken down into its component subsystems. In general, RIBA 56 provides the interface between the NPAC/SMS 18 and the Interface Broadcast Agent Repository ("IBAR") 110. In the preferred embodiment, requests are formatted using a Common Message Management Information Protocol ("CMIP") and once received by the IBA Agent 112 and are then forwarded to any one of the IBA Message Handlers ("IMH") 114, 122, 124, 126 or 128. Preferably, four (4) IMHs are used, each handling CMIP requests for a specific object type: one for subscription versions 122, one for service provider networks 124, one for LRNs 126 and one for NPA-NXXs 128. Each IMH 122, 124, 126 and 128 handles the CMIP requests which are received and updates the IBA Database 102. The IBA Agent 112 also receives notification, recovery complete and action transactions. These transactions are forwarded to appropriate logging functions, which, in turn, process and handle the transactions and update the IBA database 102.

Upon startup, the IBA Agent 112 reads each data item (subscription version, LRN, NPA/NXX, etc.) from the RIBA database 102 and load them into memory. These data items form the Managed Instance Tree ("MIT") used by the RIBA 56 as reference points to the stored data during its operation. Once the reload has completed, the IBA Agent 112 binds to the NPAC/SMS 18. When the bind has been successfully established, the IBA Agent 112 requests that the NPAC/SMS 18 download all of the subscription, NPA-NXX and LRN data which was accumulated during the time that the IBA Agent 112 was not bound to the NPAC/SMS 18. Upon successful completion of the download, the IBA Agent 112 informs the NPAC/SMS 18 that the download has been completed and normal processing resumes.

In one embodiment, the IBA Database 102 is updated from files using the File Transfer Protocol ("FTP") as illustrated by blocks 130 and 132. The FTP applications 130 and 132 are controlled by an operator which involves the steps of reading the subscription version 130 and service provider network information 132 to form a file and update the appropriate database tables with the new information.

Table 2 is a domain field listing for an the IBA Database 102 according to one embodiment:

TABLE 2

Domain field list for IBA Database.

| Name | Code | Label | Type |
|---|---|---|---|
| billingIdentifier | BILLING_ID | Billing Identifier | VARCHAR2(4) |
| booleanIndicator | BOOL_IND | Boolean Indicator | NUMBER(1) |
| city | CITY | | VARCHAR2(20) |
| CLASS DPC | CLASS_DPC | | VARCHAR2(9) |
| CLASS SSN | CLASS_SSN | | NUMBER(3) |
| CNAM DPC | CNAM_DPC | | VARCHAR2(9) |

TABLE 2-continued

Domain field list for IBA Database.

| Name | Code | Label | Type |
|---|---|---|---|
| CNAM SSN | CNAM_SSN | | NUMBER(3) |
| contactType | CONTACT_TYP | Contact Type | VARCHAR2(2) |
| country | COUNTRY | | VARCHAR2(20) |
| endUserLocation Type | END_USER_LOC_TYPE | | VARCHAR2(2) |
| endUserLocation Value | END_USER_LOC_VALUE | | VARCHAR2(12) |
| identifier | ID | | NUMBER(10) |
| ISVM DPC | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB_SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |
| operationAction | OPER_ACT | | NUMBER(3) |
| organizationId | ORGNZ_ID | ID number of an organization, client, NPAC, regional IBA. | VARCHAR(3) |
| Postal Code | PC | Postal Code | VARCHAR2(40) |
| servProvID | SP_ID | | VARCHAR2(4) |
| stateProvince | STATE_PROV | State/Province | VARCHAR2(2) |
| status | STATUS | Status Flag | NUMBER(10) |
| systemType | SYSTEM_TYPE | | N1 |
| telephone Number | TN | Telephone Number | VARCHAR2(10) |
| timestamp | T | | DATE |
| tunableName | TUNABLE_NAME | Tunable Name | VARCHAR2(40) |
| tunableValue | TUNABLE_VALUE | Tunable Value | VARCHAR2(40) |
| userIdentifier | USER_ID | | VARCHAR2(30) |
| zip | ZIP | | VARCHAR2(40) |

All of the applications within the RIBA subsystem 56 (except the FTP processes 130 and 132) are monitored by the Process Monitor 134. The Process Monitor 134 is responsible for invoking applications when they are required and if a process terminates the Process Monitor 134 is notified. Applications that are intended to always be running are automatically restarted by the Process Monitor 134 if they terminate.

Any transactions received by the IBA Agent 112 are forwarded to the appropriate logging applications such as the IBA Notification Logger 116, the IBA Recovery Complete Logger 118 or IBA Action Logger 120. Each of the logging applications 116, 118, 120 handle the transactions and update the IBA Database 102.

The IBA Database 102 can also be updated from flat files by the FTP Network Download 132 and FTP Subscription Version Download 130 applications. The Check Link application 136 monitors the physical connection between the RIBA 56 and NPAC/SMS 18. If the physical connection is broken, Check Link 136 will reset the RIBA subsystem 56.

All the processes within the RIBA subsystem 56 (with the exception of the FTP processes 130 and 132) are monitored by the Process Monitor 134. Thus, the Process Monitor 134 is the parent process for both the SOA 32 and RIBA 56 subsystems and watches over all of the standard processes required to run each system. The IBA Message Handlers ("IMH") 122, 124, 126 and 128 are used to accept messages from NPAC/SMS 18 and to perform the required actions on these messages.

The IMHs 122, 124, 126 and 128 also receive messages from the NPAC/SMS 18 requesting operations to be performed on the database tables of the IBA Database 102. Examples of these operations include SET, CREATE and DELETE. When the NPAC/SMS 18 sends a message to the RIBA 56, it is received by the DSET DSG Agent, validated and stripped of protocol related information. The DSET DSG Agent determines which of the four IMH applications (Service Provider 124, NAP-NXX 128, LRN 126 and Subscription Version 122) the message is addressed to and sends the data to the corresponding application process via a UNIX socket interface. When the appropriate IMH (either 122, 124, 126 or 128) accepts the message, the data is then extracted from the message and the operation is determined. An SQL statement is built for the action with the data values extracted from the message and the SQL statement is performed, updating the IBA Database 102.

The Network Download File Transfer Protocol 132 is used to restore the IBA Database 102 and IBAR 110 from the NPAC/SMS 18 via FTP/TCPIP. The IBAR 110 provides a means for holding and distributing the data received from the NPAC/SMS 18 to all the various downstream systems maintained by the service provider. In the preferred embodiment, all activities from the download file transfer are logged. The Subscription Version Download File Transfer Protocol 130 may also be used to restore the IBAR 110 and RIBA database 102 from the NPAC/SMS 18 using FTP/TCPIP. Preferably, the activities from the download file transfer are logged.

In use, the NPAC/SMS 18 sends variable length create requests to the CMIP Agent 112 consisting of subscription data and a list of one or more telephone numbers for each subscription data element. The CMIP Agent 112 extracts the create request from the CMIP message and formats it into a structure suitable for use by the IBA Action Logger 112 which, in turn, extracts the subscription version data from the structure.

The IBA Notification Logger 116 is used to log notifications received by the CMIP Agent 112. In this way, the NPAC-SMS Operational Information and VersionNew NPA-NXX notifications are logged. The CMIP Agent 112 receives these notifications from the NPAC/SMS 18, formats the information into a usable structure and forwards the structure to the IBA Notification Logger 116 over a UNIX socket. The IBA Notification Logger 116 is started by the Process Monitor 134 at the request of the CMIP Agent 112.

The IBA Recovery Complete Logger 118 is used to log Recovery Complete Replies and Download Replies sent by the NPAC/SMS 18 to the IBA Agent 112. The IBA Agent 112 receives these actions from the NPAC/SMS 18, formats the information into a usable structure and forwards the structure to the IRA Recovery Complete Logger 118 over a UNIX socket. The IBA Recovery Complete Logger 118 is started by the Process Monitor 134 at the request of the IBA Agent 112.

A particularly advantageous aspect of the present invention is that it provides interfaces from the Interface Broadcast Agent Repository 110 to internal systems operated by the individual service provider. In one embodiment, four proprietary downstream systems have been coupled to the IBAR 110 for receiving data. The Network Control System ("NCS") and RTE7 systems manage local number portability information in the long distance environment while the Metro Intelligent Network Administration Service Management System ("MINA/SMS") is configured to manage local number portability information on the local service network level. Also, the ANI Reference Information System ("ARIS") collects local number portability ("LNP") information for distribution to service provider business systems 44, 46 and 48.

Figure 6:
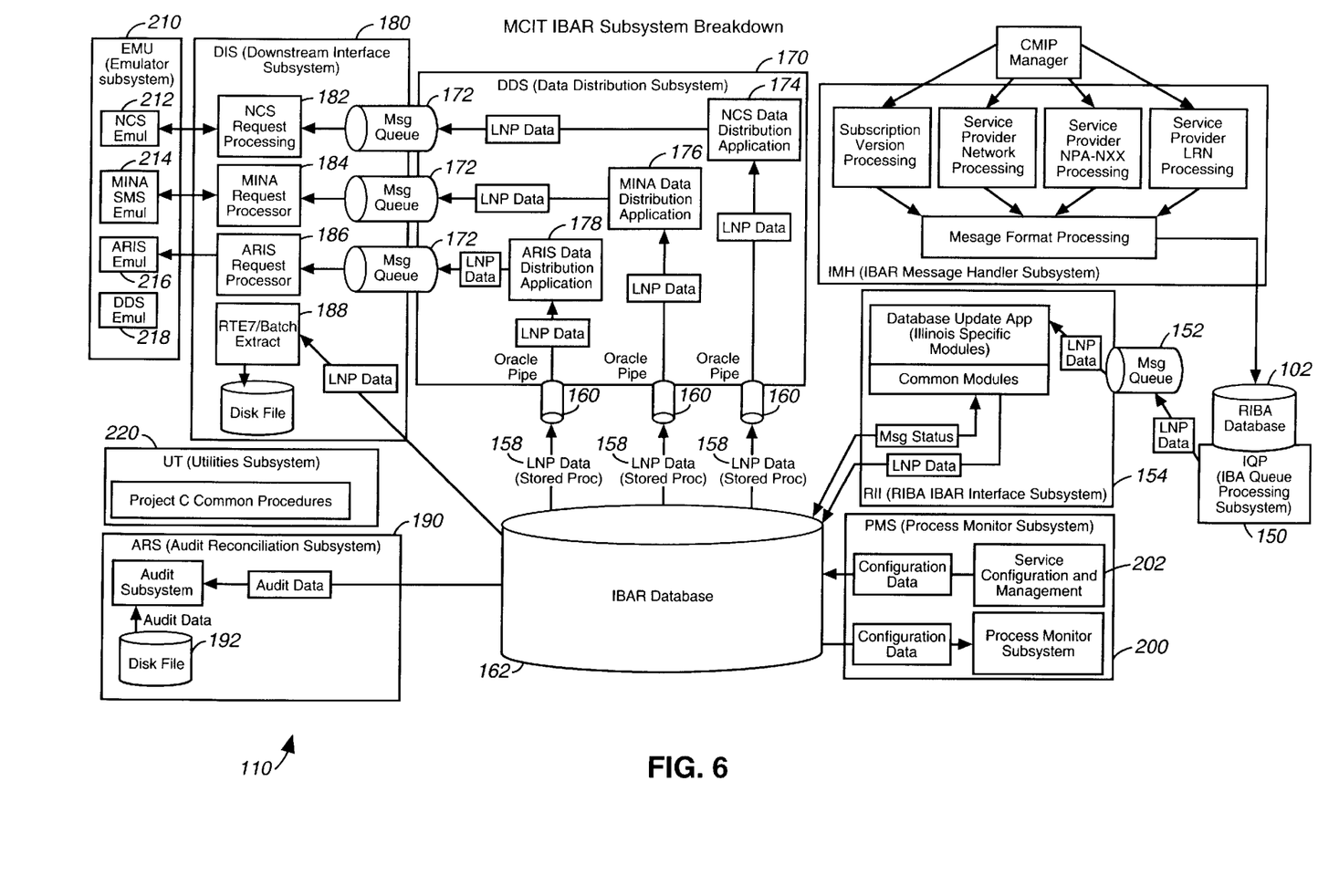
FIG. 6 is a detailed block diagram of the Interface Broadcast Agent Repository subsystem broken down into its component subsystems.

As such, and according to one embodiment of the invention, the IBAR 110 supports the following features:

A facility to consolidate LNP data from the RIBA Database 102 into the IBAR 110.

A data distribution application that manages distribution of data to the ARIS, MINA/SMS, and NCS systems. This application will track the status of transactions to each of these systems.

An on-line interface to the NCS long distance support system preferably using the DECmessageQ product from Digital Equipment Corp.

An on-line interface to the MINA/SMS system preferably using Service Builder System Management Interface product from Northern Telecom.

An on-line interface to the ARIS system preferably using the Registry Messaging product from MCI.

A batch interface to the RTE7 long distance support system using FTP. A database update application (the RII subsystem) reads the data from the message queue and performs the necessary database updates in the IBAR 110.

In one embodiment, a stored procedure extracts data from the IBAR 110 and writes the data to one of three links, each dedicated to one of the downstream on-line interface applications. Data from each link is read by a dedicated data distribution application (part of the DDS subsystem 170 shown in FIG. 6) which will in turn broadcast it to dedicated message queues for the ARIS, MINA/SMS and NCS request processing applications.

The Process Monitor 134 provides the means to start and stop the IBAR 110 and monitors each application or restarts any application which terminate abnormally.

Turning to FIG. 6, the subsystem for the Interface Broadcast Agent Repository ("IBAR") is shown and denoted generally as 110. An IBA Queue Processor ("IQP") 150 is responsible for sending all the changes that the RIBA subsystem 56 receives from the NPAC/SMS 18 to the IBAR 110. The IQP subsystem 150 is also responsible for ensuring all records of transactions on the RIBA 56 are delivered to the IBAR 110.

In operation, the IQP subsystem 150 processes records from a specific database table and puts the information into a message queue 152. The IQP subsystem 150 will process all responses from the IBAR system 110 and make the appropriate updates to the table. The IQP subsystem 150 numbers each message before it is put into the message queue 152 to ensure the messages are delivered in sequential order. The IBAR 110, in turn, verifies that the message read is the next consecutively numbered message from the RIBA 56.

In one embodiment, the IBAR 110 responds to each message sent as to whether it was successfully applied, rejected due to validation errors, or needs to be resent. If the number is out of sequence then the IBAR 110 issues a "resend" of the specific message and any messages that have been put into the Message Queue 152 after that specific message. If the specific message requested for resend cannot be found, a "lost" message notification is sent and the resend continues.

The RIBA to IBAR Interface ("RII") 154 is responsible for keeping the IBAR 110 up to date with the changes that occur on the RIBA 56. The RII 154 receives messages from a RIBA 56 via the Message Queue 152, interprets the messages and performs the appropriate database functions. Multiple instances of the RII 154 may be run to accommodate various types of NPAC/SMS 18 including the ones that are operated by Lockheed-Martin and Perot. RII 154 will call stored procedures 158 to perform the database transactions and to populate links 160 with the information stored in the IBAR Database 162.

In the preferred embodiment, the RII 154 receives messages from the RIBA 56 via a specific message queue 152. Messages are processed, and the underlying message data acquired and organized by tasks broken down at the 'object' level (i.e. Telephone Number, Audit, Service Provider, and Network). The Database 162 is updated with the 'object' data and at the end of a successful transaction, the RII 154 will issue a confirmation message to the message queue 152.

The RII 154 verifies each message received from the RIBA 56, to ensure that no duplicate messages from the RIBA 56 are processed. This is accomplished by each RIBA 56 tagging all messages with tracking numbers. The RII 154 subsystem records all tracking numbers associated with a RIBA 56 and matches the record with the tracking number in the IBAR database 162. This provides the ability to track messages from any RIBA 56.

The RII 154 also has the ability to receive messages from various types of NPAC/SMS 18. Each NPAC/SMS 18 may have different information that is to be sent to the RIBA 56 and then the IBAR 110. Since each NPAC/SMS 18 could have different information to send and thus a version ID is used to identify the type of NPAC/SMS 18 reviewing a given region. In the RIBA 56, the information is mapped to set structures and sent through the message queue 152. The RII 154 subsystem is able to recognize the type of structure that was populated by the RIBA 56 and map the information to the appropriate database fields. The use of the version ID allows for multiple NPAC/SMS 18, via the RIBA 56, to send all information to one message queue 152.

Also shown is a Data Distribution Subsystem ("DDS") 170 which sends transactions to a second message queue 172 for a downstream interface. Preferably, multiple Data Distribution application formats are supported including NCS 174, ARIS 176 and MINA 178, one for each of the downstream interfaces. In one embodiment, data is retrieved from an Oracle pipe 160 and forwarded to an interface subsystem on the message queue 172. Once the message has been sent to the downstream interface, the record in the IBAR Database 162 will have its status changed to "Sending" indicating that the message has been sent to keep track of the state of the transaction.

In one implementation, the Downstream Interface Subsystem ("DIS") 180 supports four proprietary interfaces: the MINA/SMS 182, ARIS 184, RTE7 186 and NCS 188. It should be understood, however, that any interface may be supported depending on the subsystem supported by the service provider. With the proprietary interfaces, the DIS 180 allows the IBAR 110 to communicate with external systems using the following mechanisms:

The MINA/SMS interface 182 is implemented as a stream of data sent via a TCP/IP socket interface using SMI protocol.

The NCS interface 188 is implemented using the ported telephone number and request Service Provider NPA-NXX data received from the Data Distribution Subsystem 170 from the message queue 172 and sent to the NCS. Preferably, the communication is set up as a two-way dialog, i.e. IBAR 110 sends data to the NCS, and the NCS replies after processing the data.

Ported telephone number data received from the Data Distribution Subsystem 170 on message queue 172 and sent to ARIS 186 using MCI Registry or a similar communications protocol.

The RTE7 interface 188 is implemented as a file of ASCII based data sent via TCP/IP using FTP software Preferably, this file is created on a regularly scheduled basis in batch mode.

In one embodiment, three (3) real time on-line interface applications are found in the DIS 180 that support NCS 182, MINA/SMS 184, and ARIS 188. A user is able to access a menu from which he/she can select one of the following options:

1. disconnect from NCS msgQ
2. connect to NCS msgQ
3. logoff MINA/SMS session
4. logon to MINA/SMS session
5. deregister from ARIS registry
6. register with ARIS Registry In response to a selection, the Service Configuration and Management Application ("SCM") 202 will send a signal to one of three DIS applications 182, 184 or 186. In the UNIX operating environment, two signals are used: SIGUSR1 and SIGUSR2. The SIGUSR1 signal is used for "connect" and "logon" commands with the SIGUSR2 signal reserved for "disconnect" and "log off" commands.

The Audit/Reconciliation Subsystem ("AARS") 190 provides a downstream system for interfacing with the IBAR 110 and provides the ability to compare service provider databases against the IBAR Database 162. The ARS 190 will support both regularly scheduled and on demand audit requests. In one embodiment, a system administrator is given the ability to schedule regular audits and request on-demand audits. Audit data can be extracted from the IBAR database 162 and written to a disk file 192 for transmission to a downstream system using FTP. The ARS 190 will support requests for subsets of the data in the IBAR database 162 as well as complete database dumps.

FIG. 6 also shows the use of a Process Monitor Subsystem ("PMS") 200 within the IBAR 110. The PMS 200 is started at system start-up and spawns the initial IBAR applications including DDS 170, DIS 180 and RII 154 subsystems. In other embodiments, more copies of the same systems can be spawned by the PMS 200 upon request. The initial information is stored in a file and loaded by the PMS 200 when it is started.

As shown, the SCM 202 is a part of the PMS 200 and provides the means to stop and restart communications between each of the real time on-line interfaces found in the DIS 180 and its downstream server counterpart operated by the service provider.

An Emulator Subsystem ("EMU") 210 is communicably linked to the DIS 180 and in the preferred embodiment supports four different emulators: the NCS 212, MINA/SMS 214, ARIS 216 and DDS 218 emulators. The EMU 210 programs are used for testing and validation of the DIS 180. In one embodiment, communication between the DIS 180 and EMU 210 subsystem programs is accomplished using different protocols for each individual program, as follows:

| DDS Emulator | DECmessageQ |
|---|---|
| NCS Emulator | DECmessageQ |
| MINA SMS Emulator | UNIX TCP/IP socket library |
| ARIS Emulator | Registry |

The utilities subsystem 220 contains a set of utility functions that are available to speed development of UNIX and SQL programs. These functions have been developed specifically for use in the IBAR 110 application environment and provide solutions to common problem requirements such as Oracle stored procedures 158, message queue access, FTP access, error handling, process signal control and any other software functions that may be best implemented as a utility.

As stated, the SOA 32 and IBA 34 subsystems interface with the NPAC/SMS 18, such as that maintained by Lockheed Martin in Illinois. In this sequel, a Graphical User Interface may be used to provide a human-machine interface between the service provider Order Entry/Order Processing ("OE/OP") systems, such as the one illustrated in FIG. 7, and the SOA 32 and IBA 34 subsystems.

Figure 7:
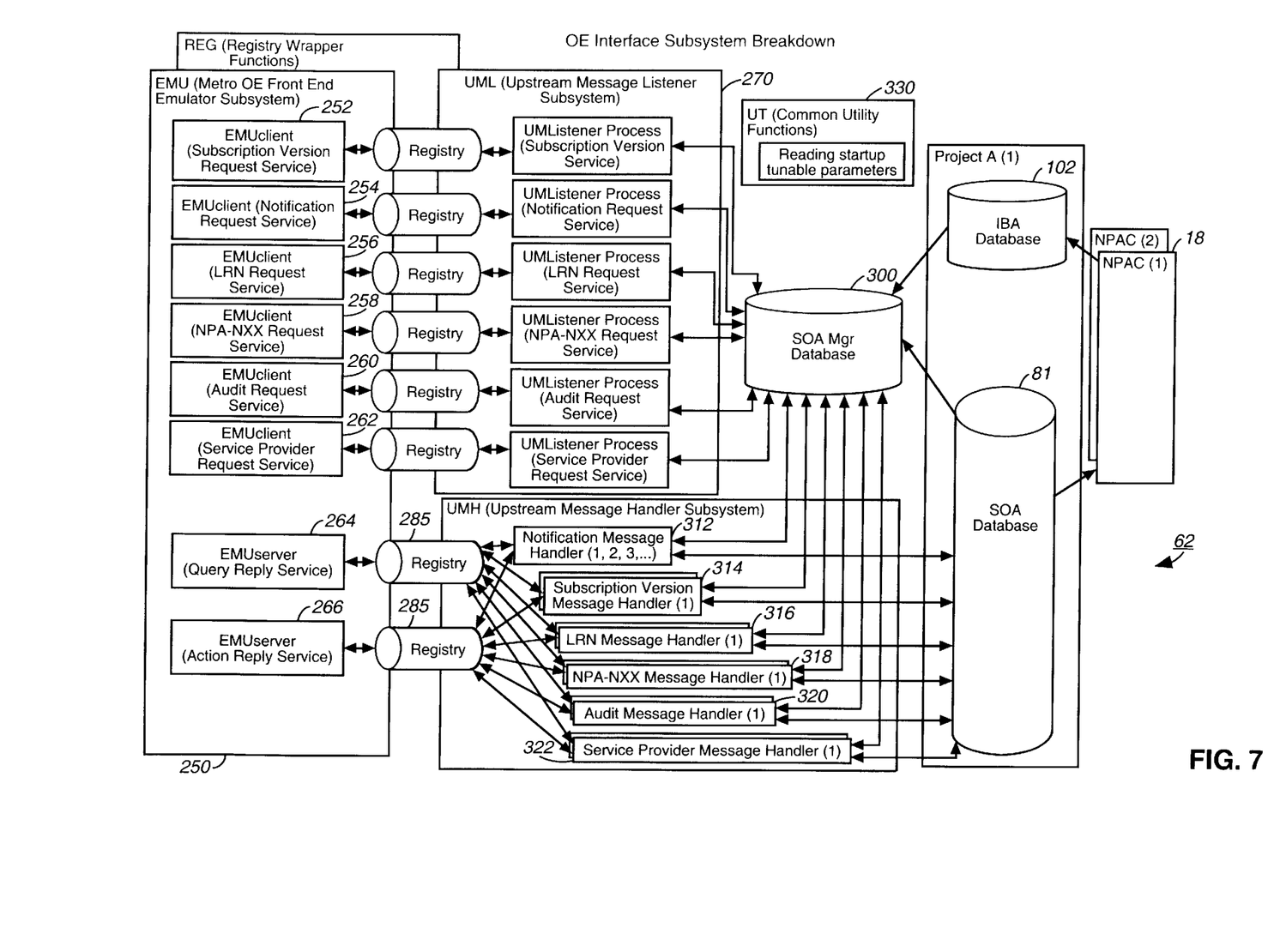
FIG. 7 is a block diagram illustrating the Order Entry/Order Processing interface subsystem according to one embodiment of the invention.

In one embodiment, a mechanized interface supporting uploading of data, audits/queries of the NPAC/SMS 18 and operational messaging is supplied. Thus, the Subscription Version 252, Notification 254, LRN Request 256, NPA-NXX Request 258, Audit 260 and Service Provider Request 262 services can comprise the base set of messages for communications between OE/OP 250 and the SOA 32.

Each request message received from the SOA 32 receives a reply back from the a Listener Application 270 indicating that the message has been received and queued for transmission to the appropriate NPAC/SMS 18. This reply does not, however, indicate that the message has been sent to or processed by the NPAC/SMS 18. When the message has been sent to and processed by the NPAC/SMS 18, a response message from the SOA 32 will be sent to OE/OP 62 containing the result of the original request message returned by the NPAC/SMS 18.

The Upstream Message Listener ("UML") 270 is responsible for receiving SOA 32 front end messages to be delivered to an NPAC/SMS 18 and to write these requests to the SOA Manager Database 300. The UML 270 is also responsible for determining the particular NPAC/SMS 18 to which each message is to be delivered.

The Upstream Message Handler Subscription Version ("UMHSV") 314 will poll the SOA Manager Subscription version queuing table to retrieve all records based on telephone number range. Each record retrieved is analyzed to determine the action to be performed based on the message type of the record and record status.

If the record is a new message the UMHSV 314 will call the appropriate stored procedure. Once a response is received from the stored procedure, it is evaluated and the return code is used to update the record status in the queuing table and a response message is created containing the message data and header. If the record is not a new message, a "resend" message will be reissued containing only the error message header. The response message will be sent to the OE Front End 250 on Registry 288. The UMHSV 314, in turn, will wait for a confirmation from the front end 250 of a successful receipt of the message in order to delete the record from the message queuing table.

The Upstream Message Handler LRN ("UMHLRN") 316 polls the SOA Manager LRN queuing table to retrieve all LRN Message records. Each record retrieved is analyzed to determine the action to be performed based on the message type, record status, and received date of the record.

If the record is a new message, the UMHLRN 316 calls the appropriate stored procedure. The returned value of the stored procedure will be evaluated and a response message will be created.

If the record is not a new message, the date of the record is examined. If it is expired, it will be deleted from LRN queuing table. Otherwise, a response message will be created and sent to the SOA front end 250 via Registry 285. If the UMHLM 316 receives a confirmation of a successful receipt of the message, the UMHLRN 316 deletes the record from the message queuing table. Otherwise, the result status of the queuing table will be updated for the request.

The Upstream Message Handler NPA-NXX ("UMH NPA-NXX") 318 is used to poll the SOA Manager NPA-NXX queuing table to retrieve all NPA-NXX Message records. Each record retrieved is analyzed to determine the action to be performed based on the message type, record status, and received date of the record. If the record is a new message, the UMH NPA-NXX 318 calls the appropriate stored procedure. The returned value of the stored procedure will be evaluated and a response message created.

If the record is not a new message, the date of the record is examined and if it is expired, it will be deleted from NPA-NXX queuing table. Otherwise, an error response message is created. The response message is sent to the front end 250 via Registry 285. If the application received a confirmation of a successful receipt of the message from the front end 250, the Message Handler 318 deletes the record from the message queuing table. Otherwise, the result status of the queuing table will be updated for the request.

The Audit Message Handler 320 is used to poll the SOA Manager Audit queuing table to retrieve all request records for processing. Each record retrieved is analyzed to determine the action to be performed based on the message type of the record and record status. If the record is a new message, the Message Handler 320 calls the appropriate stored procedure. Once a response is received from the stored procedure, it is evaluated and the return code is used to update the record status in the queuing table and a response message is created containing the header and the message data.

If the record is not a new message, the response message is created containing an error message header. If the record is a new message but has been queued longer than a configurable amount of time, it is considered to be expired. The response message is created containing an error message header. The response message will be sent to the front end 250 via Registry 285. The process will wait for a confirmation from the front end 250 of a successful receipt of the message in order to delete the record from the message queuing table.

A Provide Message Handler Application 322 is also provided for polling the SOA Manager Provider queuing table to retrieve all request records. Each record retrieved is analyzed to determine the action to be performed based on the message type of the record and record status.

If the record is a new message, the Service Provider 322 calls the appropriate stored procedure. Once a response is received from the stored procedure, it is evaluated and the return code is used to update the record status in the queuing table and a response message is created containing the header and the message data. If the record is not a new message the response message is created containing an error message header. If the record is a new message but has been queued longer than a configurable amount of time, it is considered to be expired. The response message is created containing an error message header.

The response message is sent to the front end 250 via Registry 285. The service provider waits for a confirmation from the front end of a successful receipt of the message in order to delete the record from the message queuing table.

The Upstream Message Handler 310 also includes a Notification Message Handler 312 that polls the SOA Manager Notification table to retrieve all records. The action to be performed on each retrieved record will be determined based on the message type and the status of the record.

If the record is a new request, the information needed to create the response message will be fetched from the SOA MGR Database 300 or the corresponding database table will be updated.

If the record is not a new request, an error response message will be created and sent to the front end 250 via Registry 285. If the process received a confirmation of a successful receipt of the message from the front end 250, the Message Handler 310 deletes the record from the SOA Manager Notification table. Otherwise, the result status of SOA Manager Notification table will be updated for the request. The Message Handler 310 keeps running until all the records in the SOA Manager Notification table are processed. If there is no more record in the SOA Manager Notification table, the Message Handler 310 sleeps for a certain time before it wakes up and begins to poll the SOA Manager Notification table again.

The Emulation Subsystem 250 includes an application called EMU Server 264 and 266 which emulates the SOA Front End server. The EMU Server 264, 266 receives messages from the SOA message handlers direct from the service providers messaging and communication systems and the messages, in turn, are parsed, displayed on the console and saved to a Log file.

The EMU server application 264, 266 emulates the SOA Front End client by reading sample messages from a file and passing them onto the corresponding listener using the Registry 285. The EMU client waits for a reply from the listener before sending another message.

In the preferred embodiment, a utilities subsystem 330 is provided and comprises a set of utility functions that are available to speed development of UNIX and SQL programs. These functions have been developed specifically for use in the OE Interface application environment to provide solutions to common programming requirements, such as Oracle stored procedures.

Preferably some method of access control is provided to manage security issues that arise from communications between the IBA 34/SOA 32 subsystems and the NPAC/SMS 18. In one embodiment, an access control field is included in messages flowing between the IBA 34/SOA 32 subsystems and the NPAC/SMS 18 and carries a digital signature. As is known by those skilled in the art, a digital signature is used for authentication purposes to guarantee the identity of the message sender.

In one embodiment, messages flowing between the IBA 34/SOA 32 subsystems and the NPAC/SMS 18 incorporate a variable called "LnpAccessControl" for the access control field with the following information:

SystemID:
An identifier for the system that is using the interface. This is a key element in the authentication process. While it is passed in each Protocol Data Unit, it is only really important in the association establishment.

SystemType:
Identifies the kind of system that is connecting: SOA, IBA, SOA and IBA or NPAC.

UserId:
An optional field that passes a userId used mostly for logging.

ListId:
This is an integer that identifies the list from which a key was chosen to create the signature.

KeyId:
This is an integer that identifies which key from the 1000 keys in a list was used to generate a signature.

CMIP Departure Time:
This is the time at which a message was sent.

Sequence Number:
This is 32 bit unsigned integer that starts at 0 and is incremented until wrapping at the maximum value.

Signature:
The signature field contains the MD5 hashed and encrypted systemId, the system type, the userId, the cmipDepartureTime, and sequenceNumber without separators between those fields or other additional characters. Encryption is done using RSA encryption using the key from the key list specified. Validation of this field ensures data integrity and non-repudiation of data.

Association Functions:
These are set of flags that are set when an association is established.

Recovery Mode:
The recovery mode flag is used to recover after downtime.

Definitions:
When used, the terms "interface", "line", "lines", "link", "communications link", "inbound link" and/or "outbound link" can mean a channel, signal pathway, data path, circuit, or other similar mechanism whether physical, virtual or logical. The terms "outbound link" and "inbound link" have meaning in the context of the Oracle database structure and associated protocols as "pipes" which can be used for the transfer and communication of data from system applications and programs, whether external or internal. The terms "outbound link" and "inbound link" also have meaning in the context of the Unix operating system structure and associated protocols as "sockets" which can be used for the transfer and communication of data from system applications and programs. Such conventions are well known to those skilled in the art.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. A system for maintaining a customer's local telephone number when a switch is made from a first service provider to a second service provider, said system comprising:

a regional number portability subsystem containing a plurality of telephone number porting data defining how to route a call from said first service provider to said second service provider;

a service order application communicably linked to said regional number portability subsystem via a first data pathway and configured to send a porting request for a specific customer, said service order application comprising means for receiving and processing customer orders for local service, a local service order database containing a plurality of current telephone number and customer transaction information, and a service order application engine forming a bridge between said means for receiving and processing customer orders and said service order database, said service order application engine configured to update said service order database with customer specific telephone number data;

a local service management application communicably linked to said regional number portability subsystem via a second data pathway, said local service management application configured to receive said porting request, said local service management application supporting an interface to said second service provider for delivering said porting request and providing new routing data about said specific customer using the customer's existing telephone number; and a check link application which monitors the interface between said service order application and said regional number portability subsystem.

2. The system for porting a customer's local telephone number according to claim 1 wherein said local service management application comprises:

a regional service database containing a plurality of current telephone number and customer transaction information;

an interface agent application to said regional number portability subsystem, said interface agent application configured to receive customer routing messages from said service order application;

means for handling said customer routing messages depending on the object type; and means for updating said regional service database.

3. The system for porting a customer's local telephone number according to claim 2 further comprising a check link application which monitors the interface between said local service management application and said regional number portability subsystem.

4. The system for porting a customer's local telephone number according to claim 3 wherein said check link application is configured to reset said local service management application when said interface between said local service management application and said regional number portability subsystem is broken.

5. The system for porting a customer's local telephone number according to claim 2 further comprising a plurality of transaction logging applications configured to receive transaction requests, handle said requests and update said regional service database.

6. An interface system for communicating telecommunications customer porting requests from a local service provider to a number portability administration center, said interface system comprising:

means for interfacing to local service provider business applications, said means configured to accept transaction data from said business applications and operably linked to at least one local order entry processing terminal;

a transaction database communicably linked to said means for interfacing to local service provider business applications, said transaction database containing a plurality of customer telephone number data and a plurality of internally stored transaction transfer applications that control the flow of data between said local service provider and said number portability administration center;

a transaction message handling application communicably linked to said plurality of internally stored applications for reading transaction data designated for said number portability administration center;

a managing application configured to receive said transaction data from said transaction message handling application, said managing application communicably linked to said number portability administration center ;and a synchronization application coupled to both said transaction database and said managing application and configured to re-synchronize said interface system after a predetermined period of downtime.

7. The interface system according to claim 6 further comprising an unsolicited event handler application communicably linked to said managing application for receiving notification transactions.

8. The interface system according to claim 6 further comprising:

a local service database containing a plurality of customer telephone number data; and a discrepancy reporting application communicably linked to both said local service database and said transaction database.

* * * * *